United States Patent

Smith

[15] 3,689,520

[45] Sept. 5, 1972

[54] CATALYTIC PREPARATION OF AROMATIC ISOCYANATES

[72] Inventor: Eric Smith, Madison, Conn.

[73] Assignee: Olin Mathieson Chemical Corporation,

[22] Filed: Feb. 3, 1969

[21] Appl. No.: 796,208

[52] U.S. Cl. .....260/453 PC, 252/429 A, 252/429 C, 260/454, 260/566 R, 260/551 R

[51] Int. Cl. ............................................C07c 119/04

[58] Field of Search.....................260/453 P, 453 PC

[56] References Cited

UNITED STATES PATENTS 3,461,149    8/1969    Hardy et al................260/453

Primary Examiner—Joseph Rebold
Assistant Examiner—Dolph H. Torrence
Attorney—Walter D. Hunter, Gordon D. Byrkit, Donald F. Clements, Ellen P. Trevors, Richard S. Strickler, Robert H. Bachman, Donald R. Motsko and Thomas P. O'Day

[57] ABSTRACT

The process for preparing an organic isocyanate by reacting an organic nitro compound with carbon monoxide in the presence of a catalyst system comprising a halide of a noble metal and a heterocumulene compound having the formula:

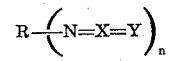

wherein R is an aryl moiety, X is C or S; Y is O, S or NR where R has the same meaning as previously described; $n$ is an integer of from 1 to 2 inclusive and with the proviso that when Y is S, then X is C. Especially useful heterocumulene compounds include compounds of the formula:

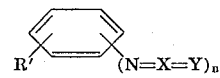

wherein R' is selected from the group consisting of hydrogen, alkyl, aryl, alkaryl, and aralkyl; X is C or S; Y is S, O or —NR", wherein R" is an aryl group; and $n$ is an integer of from 1 to 2 inclusive and with the proviso that when Y is S, then X is C. Examples of preferred heterocumulene compounds include phenyl isocyanate, p-tolyl isocyanate, phenyl isothiocyanate, p-tolyl isothiocyanate, 2,4-toluene diisocyanate, N-sulfinyl-p-toludine, N-sulfinyl aniline, diphenyl carbodiimide, and N,N'-di-p-tolyl carbodiimide. The noble metal halide is preferably a halide of palladium, rhodium, iridium, rhenium, platinum, and mixtures thereof. The catalyst system may also include molybdenum trioxide or another metal oxide.

20 Claims, No Drawings

CATALYTIC PREPARATION OF AROMATIC ISOCYANATES

This invention relates to an improved process for a preparation of organic isocyanates from organic nitro compounds in which a catalyst system comprising a halide of a noble metal and a heterocumulenes compound selected from the group consisting of an isocyanate, an isothiocyanate, a sulfinyl amine, a carbodiimide or a sulfodiimide compound is employed.

The heterocumules useful in this invention include certain classes of nitrogen-containing heterocumulene compounds. The term heterocumulene is used herein to describe a system containing two adjacent double bonds in a chain terminated at each end by a heteroatom, such as:

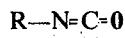

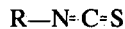

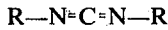

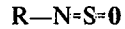

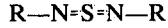

Organic isocyanates are used extensively in the preparation of urethane foams, coatings, and fibers, as well as in the preparation of insecticides, pesticides, and the like. Commercial process for preparing organic isocyanates utilize the catalytic hydrogenation of an organic nitro compound to form the corresponding amine, followed by reaction of the amine with phosgene to form the corresponding isocyanate. These processes are complex and expensive, and the need for a simplified, less expensive process is apparent.

In order to provide a simplified technique, it has been proposed to react an organic nitro compound with carbon monoxide in the presence of a catalyst. For example, British Pat. No. 1,025,436 discloses a process for preparing isocyanates from the corresponding nitro compound by reacting an organic nitro compound with carbon monoxide in the presence of a noble metal-based catalyst. This process is not used commercially, because no more than trace amounts of organic isocyanates are formed when an organic nitro compound such as dinitrotoluene is reacted with carbon monoxide using a noble metal-based catalyst, such as rhodium trichloride, palladium dichloride, iridium trichloride, osmium trichloride, and the like.

Other proposed simplified techniques utilize other catalyst systems. For example, Belgian Pat. No. 672,405 entitled "Process For The Preparation Of Organic Isocyanates," describes the use of a catalyst system of a noble metal and/or a Lewis acid in the reaction between an organic nitro compound with carbon monoxide.

Unfortunately, the yield of organic isocyanate afforded by these simplified techniques has not been significant enough to justify their use on a commercial scale.

It is a primary object of this invention to provide an improved process for the preparation of organic isocyanates.

Another object of the invention is to provide a novel catalyst system useful in the direct conversion of organic nitro compounds to the corresponding organic isocyanates.

Still a further object is to provide an improved process for preparing aromatic isocyanates such as phenyl isocyanate, toluene diisocyanates, and isocyanato-nitrotoluenes.

These and other objects of the invention will be apparent from the following detailed description thereof.

It has now been discovered that the above-mentioned objects are accomplished when an organic nitro compound is reacted with carbon monoxide at an elevated pressure and an elevated temperature in the presence of:

I. a catalyst system comprised of
A. at least one compound of the formula:

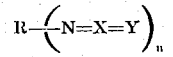

wherein R is an aryl moiety, X is C or S; Y is O, S, or —NR, where R has the same meaning as previously described; n is an integer of from 1 to 2 inclusive and with the proviso that when Y is S, then X is C, and
B. at least one noble metal halide, or II. a catalyst system comprised of a complex of IA and a halide of IB.

One group of heterocumulene compounds which are especially useful in the process of this invention include compounds of the formula:

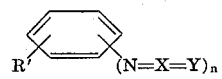

wherein R' is selected from the group consisting of hydrogen, alkyl, aryl, alkaryl, and aralkyl; X is selected from the group consisting of carbon and sulfur; Y is selected from the group consisting of oxygen, sulfur and —NR", wherein R" is an aryl group; n is an integer of from 1 to 2 inclusive and with the proviso that when Y is sulfur then X is carbon. In R' above, the alkyl group contains between one and eight carbon atoms, including methyl, ethyl, isopropyl, n-butyl, isoamyl, n-hexyl, isohexyl, n-octyl, etc., while the aryl, alkaryl, and aralkyl moieties each between six and 12 carbon atoms, such as phenyl, naphthyl, tolyl, xylyl, ethylphenyl, diethyltolyl, phenylmethyl, phenylethyl, phenylisobutyl, tolylmethyl, and xylyl m-butyl, methoxyphenyl, ethoxytolyl, isopropoxyxylyl and the like. In R" the aryl group contains between six and 12 carbon atoms and includes phenyl, ethylphenyl, n-octylphenyl, isoheptoxyphenyl, tolyl, n-hexyltolyl, xylyl, naphthyl, etc. The organic moieties referred to above may also contain halogen substituents such as chlorine, bromine and iodine.

Any organic nitro compound capable of being converted to an organic isocyanate may be employed as a reactant. Generally, aromatic, cycloaliphatic, and aliphatic mono- or polynitro compounds, which may be substituted, if desired, can be reacted to form the corresponding mono- or poly- isocyanates by the novel process of this invention. The term "organic nitro compound," is used throughout the description and claims to define unsubstituted as well as substituted organic nitro compounds of the type described herein. Typical examples of suitable organic nitro compounds which can be reacted to form isocyanates include the following:

I. Aromatic Nitro Compounds
 a. Nitrobenzene b. Nitronaphthalenes
c. Nitroanthracenes
d. Nitrobiphenyls
e. Bis(nitrophenyl)methanes
f. Bis(nitrophenyl)ethers
g. Bis(nitrophenyl)thioether
h. Bis(nitrophenyl)sulfones
i. Nitrodiphenoxy alkanes
j. Nitrophenothiazines II. Nitrocycloalkanes
a. Nitrocyclobutane
b. Nitrocyclopentane
c. Nitrocyclohexane
d. Dinitrocyclohexanes
e. Bis(nitrocyclohexyl)methanes III. Nitroalkanes
a. Nitromethane
b. Nitroethane
c. Nitropropane
d. Nitrobutanes
e. Nitrohexanes
f. Nitrooctanes
g. Nitrooctadecanes
h. Dinitroethane
i. Dinitropropanes
j. Dinitrobutanes
k. Dinitrohexanes
l. Dinitrodecanes
m. Phenyl nitromethane
n. Bromophenyl nitromethanes
o. Nitrophenyl nitromethanes
p. Methoxy phenyl nitromethanes
q. Bis-(nitromethyl)cyclohexanes
r. Bis-(nitromethyl)benzenes All of the aforementioned compounds may be substituted with one or more additional substituents such as nitro, nitroalkyl, alkyl, alkenyl, alkoxy, aryloxy, halogen, alkylthio, arylthio, carboxyalkyl, cyano, isocyanato, and the like, and employed as reactants in the novel process of this invention. Specific examples of suitable substituted organic nitro compounds which can be used are as follows:

1. o-Nitrotoluene
2. m-Nitrotoluene
3. p-Nitrotoluene
4. o-Nitro-p-xylene
5. 2-Methyl-1-nitronaphthalene
6. m-Dinitrobenzene
7. p-Dinitrobenzene
8. 2,4-Dinitrotoluene
9. 2,6-Dinitrotoluene
10. Dinitromesitylene
11. 4,4'-Dinitrobiphenyl
12. 2,4-Dinitrobiphenyl
13. 4,4'-Dinitrodibenzyl
14. Bis(p-nitrophenyl)methane
15. Bis(2,4-dinitrophenyl)methane
16. Bis(p-nitrophenyl)ether
17. Bis(2,4-dinitrophenyl)ether
18. Bis(p-nitrophenyl)thioether
19. Bis(p-nitrophenyl)sulfone
20. Bis(p-nitrophenoxy)ethane
21. $\alpha,\alpha'$-Dinitro-p-xylene
22. 2,4,6-Trinitrotoluene
23. 1,3,5-Trinitrobenzene
24. 1-Chloro-2-nitrobenzene
25. 1-Chloro-4-nitrobenzene
26. 1-Chloro-3-nitrobenzene
27. 2-Chloro-6-nitrotoluene
28. 4-Chloro-3-nitrotoluene
29. 1-Chloro-2,4-dinitrobenzene
30. 1,4-Dichloro-2-nitrobenzene
31. alpha-Chloro-p-nitrotoluene
32. 1,3,5-Trichloro-2-nitrobenzene
33. 1,3,5-Trichloro-2,4-dinitrobenzene
34. 1,2-Dichloro-4-nitrobenzene
35. alpha-Chloro-m-nitrotoluene
36. 1,2,4-Trichloro-5-nitrobenzene
37. 1-Bromo-4-nitrobenzene
38. 1-Bromo-2-nitrobenzene
39. 1-Bromo-3-nitrobenzene
40. 1-Bromo-2,4-dinitrobenzene
41. $\alpha,\alpha$-Dibromo-p-nitrotoluene
42. $\alpha$-Bromo-p-nitrotoluene
43. 1-Fluoro-4-nitrobenzene
44. 1-Fluoro-2,4-dinitrobenzene
45. 1-Fluoro-2-nitrobenzene
46. o-Nitrophenyl isocyanate
47. m-Nitrophenyl isocyanate
48. p-Nitrophenyl isocyanate
49. o-Nitroanisole
50. p-Nitroanisole
51. p-Nitrophenetole
52. o-Nitrophenetole
53. 2,4-Dinitrophenetole
54. 2,4-Dinitroanisole
55. 1-Chloro-2,4-dimethoxy-5-nitrobenzene
56. 1,4-Dimethoxy-2-nitrobenzene
57. m-Nitrobenzaldehyde
58. p-Nitrobenzaldehyde
59. p-Nitrobenzoylchloride
60. m-Nitrobenzoylchloride
61. 3,5-Dinitrobenzoylchloride
62. Ethyl-p-nitrobenzoate
63. Methyl-o-nitrobenzoate
64. m-Nitrobenzenesulfonylchloride
65. p-Nitrobenzenesulfonylchloride
66. o-Nitrobenzenesulfonylchloride
67. 4-Chloro-3-nitrobenzenesulfonylchloride
68. 2,4-Dinitrobenzenesulfonylchloride
69. 3-Nitrophthalic anhydride
70. p-Nitrobenzonitrile
71. m-Nitrobenzonitrile
72. 1,4-Dinitrocyclohexane
73. Bis(p-nitrocyclohexyl)methane
74. 1-Nitro-n-hexane
75. 2,2-Dimethyl-1-nitrobutane
76. 1,6-Dinitro-n-hexane
77. 1,4-Bis(nitromethyl)cyclohexane
78. 3,3'-Dimethoxy-4,4'-dinitro-biphenyl
79. 3,3'-Dimethyl-4,4'-dinitro-biphenyl In addition, isomers and mixtures of the aforesaid organic nitro compounds and substituted organic nitro compounds may also be employed, as well as homologues and other related compounds. Compounds which have both nitro and isocyanato substituents, such as 2-isocyanato-4-nitrotoluene, may also be employed as a reactant.

The process of this invention is particularly effective in the conversion of aromatic nitro compounds to organic isocyanates. As used herein, the term "aromatic nitro compounds" represents those aromatic nitro compounds having at least one nitro group attached directly to an aromatic hydrocarbon nucleus, such as benzene, naphthalene, and the like, wherein the aromatic hydrocarbon nucleus may be substituted as illustrated above. Among the preferred organic nitro compounds which may be used in the practice of this invention are the nitrobenzenes, both mono- and polynitro, including the various nitrated toluenes and the nitrated xylenes; nitrated biphenyl and nitrated diphenylmethylene. Other preferred reactants include bis(nitrophenoxy)alkylenes and bis(nitrophenoxy)alkyl ethers. Generally, the organic nitro compounds and substituted organic nitro compounds contain between one and about 20 carbon atoms, and preferably between about six and 14 carbon atoms.

The catalyst system of this invention is comprised of at least one heterocumulene compound of the formula:

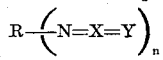

wherein R, X, Y and $n$ have the same meaning as previously described, and at least one noble metal halide. Preferably, the R moiety generally will contain from six to 20 carbon atoms and may be substituted with other innocuous groups.

Examples of heterocumulene compounds useful in the catalyst system of this invention include:
1. phenyl isocyanate
2. 1-methyl-2-isocyanato benzene
3. 1-methyl-4-isocyanato benzene
4. 1-ethyl-3-isocyanato benzene
5. 1-amyl-3-isocyanato benzene
6. 1-isohexyl-4-isocyanato benzene
7. 1-ethyl-3,5-diisocyanato benzene
8. 1-heptyl-3,4-diisocyanato benzene
9. 1-isooctyl-2,3-diisocyanato benzene
10. 1-phenyl-2-isocyanato benzene
11. 1-tolyl-3-isocyanato benzene
12. 1-xylyl-2-isocyanato benzene
13. 1-hexyl-2-isocyanato benzene
14. 1-isooctyl-4-isocyanato benzene
15. 1-ethylphenyl-2-isocyanato benzene
16. 1-isoamylphenyl-2,3-diisocyanato benzene
17. 1-diethyltolyl-3-isocyanato benzene
18. 1-methylnaphthyl-4-isocyanato benzene
19. 1-phenylethyl-3-isocyanato benzene
20. 1-phenylisopropyl-2-isocyanato benzene
21. 1-tolylmethyl-3-isocyanato benzene
22. 1-naphthyl-3-isocyanato benzene
23. 1-isopropylnaphthyl-4-isocyanato benzene
24. 1-n-propyltolyl-2,3-diisocyanato benzene
25. 1-isohexylnaphthyl-4-isocyanato benzene
26. 1-phenyl-2,4-diisocyanato benzene
27. 1-methylphenyl-3,4-diisocyanato benzene
28. 1-hexylphenyl-2,4-diisocyanato benzene
29. 1-isoheptyltolyl-3,4-diisocyanato benzene
30. 2,4-toluene diisocyanate
31. 2,5-toluene diisocyanate
32. 2,6-toluene diisocyanate
33. 1-methylnaphthyl-2,3-diisocyanato benzene
34. 1-isopropylnaphthyl-2,4-diisocyanato benzene
35. 1-ethoxy-2,4-diisocyanato benzene
36. phenyl isothiocyanate
37. 1-methyl-4-isothiocyanato benzene
38. 1-ethyl-2,3-diisothiocyanato benzene
39. 1-isohexyl-3-isothiocyanato benzene
40. 1-octyl-3,4-diisothiocyanato benzene
41. 1-propoxy-4-isothiocyanato benzene
42. 1,3-methyl-4-isothiocyanato benzene
43. 1-phenoxy-2,3-diisothiocyanato benzene
44. 1-ethyltolyl-3,4-diisothiocyanato benzene
45. 1-phenyloctyl-4-isothiocyanato benzene
46. 1-phenylethyl-3-isothiocyanato benzene
47. 1-naphthyl-3,4-diisothiocyanato benzene
48. 1-methyl-4-sulfinylamino benzene (N-sulfinyl-p-toluidine)
49. 1-ethyl-3,4-disulfinylamino benzene
50. 1-isohexyl-3-sulfinylamino benzene
51. 1-phenyl-4-sulfinylamino benzene
52. 1-tolyl-3-sulfinylamino benzene
53. 1-ethyltolyl-3,4-disulfinylamino benzene
54. 1-naphthylmethyl-4-sulfinylamino benzene
55. diphenyl carbodiimide
56. N-phenyl-N'-tolyl carbodiimide
57. N-phenyl-N'-naphthyl carbodiimide
58. N-phenyl-N'-ethylphenyl carbodiimide
59. N,N'-di-p-tolyl carbodiimide
60. N,N'-dixylyl carbodiimide
61. N-methoxyphenyl-N'-tolyl carbodiimide
62. N-phenylethylphenyl-N'-xylyl carbodiimide
63. N,N'-di-n-propoxyphenyl carbodiimide
64. diphenyl sulfodiimide
65. N-n-hexylphenyl-N'-methoxyphenyl sulfodiimide
66. N-phenyl-N'-xylyl sulfodiimide
67. N-phenyl-N'-naphthyl sulfodiimide
68. N,N'-di-p-tolyl sulfodiimide
69. N,N'-dixylyl sulfodiimide
70. N-phenyl-N'-ethoxyphenyl sulfodiimide
71. N-tolyl-N'-hexylphenyl sulfodiimide In the process of this invention certain selected heterocumulene compounds of the formula:

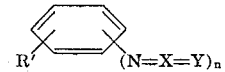

wherein R', X, Y and $n$ have the same meaning as previously described, have been found to be particularly efficacious when used with the noble metal halides. Especially useful heterocumulene compounds falling within this classification include:
phenyl isocyanate
p-tolyl isocyanate
2,4-toluene diisocyanate
phenyl isothiocyanate
p-tolyl isothiocyanate
N-sulfinyl-p-toluidine
N-sulfinyl aniline
diphenyl carbodiimide
N,N'-di-p-tolyl carbodiimide The second component of the catalyst system is at least one halide of a noble metal. Noble metals include ruthenium, rhenium, rhodium, palladium, osmium, iridium, platinum, silver and gold. The halides of palladium, rhodium, platinum, iridium, rhenium and mixtures thereof are particularly preferred noble metal halides. Typical examples of suitable halides include palladous bromide, palladous chloride, palladous fluoride, palladous iodide, rhodium tribromide, rhodium trichloride, rhodium trifluoride, rhodium triiodide; ruthenium dichloride, ruthenium trichloride, ruthenium tetrachloride; osmium dichloride, osmium trichloride, osmium tetrachloride; platinic bromide, platinous bromide, platinic chloride, platinous chloride, platinic fluoride, platinous iodide, platinic iodide, rhenium trichloride, rhenium tetrachloride, iridium tribromide, rhenium hexafluoride, rhenium tribromide, iridium tribromide, iridium tetrabromide, iridium triiodide, iridium tetraiodide, and mixtures thereof. An especially useful group of noble metal halides includes palladous chloride, rhodium trichloride, iridium trichloride, platinic chloride, and mixtures thereof. Oxides of the noble metals may also be employed and the term "halide of a noble metal" as used throughout the description and claims is intended to include the above-mentioned metal halides as well as the corresponding oxides, such as palladium oxide, rhodium oxide, platinum oxide, etc., and the like.

The use of the heterocumulene compound in catalytic combination with the noble metal halide is generally accomplished by adding the heterocumulene compound and the noble metal halide separately to the reaction system or, if desired, they may be premixed prior to adding the organic nitro compound. However, it has also been determined that complexes which can be formed by reacting the noble metal halide and the heterocumulene compound also can be utilized very effectively as the catalyst system in the conversion of the nitro compounds to isocyanates with carbon monoxide. These complexes are conveniently prepared by the reaction of the heterocumulene containing compound with the previously recited noble metal halides. For example, palladous chloride and phenyl isothiocyanate are stirred and heated together at reflux until the former dissolves. The solution is then cooled and evaporated to dryness under reduced pressure, yielding crystals of a complex formed from the palladous chloride and the phenyl isothiocyanate [Pd($C_6H_5$NCS)$_2$Cl$_2$. Thus, it is to be understood that in the practice of this invention the use of the aromatic isocyanate or isothiocyanate compound in combination with the use of the noble metal halide may involve either the separate addition of each to the reaction system or, if desired, the prior formation of a complex of the two materials and subsequent use thereof in the reaction.

The catalyst system can be self-supported or deposited on a support or carrier for dispersing the catalyst system to increase its effective surface. Alumina, silica, carbon, barium sulfate, asbestos, bentonite, diatomaceous earth, fuller's earth, and analogous materials are useful as carriers for this purpose.

The reaction is carried out in the presence of a catalytic proportion of the catalyst system. The proportion of catalyst system is generally equivalent to between about 0.001 and about 500 percent, and preferably between about 1 and about 100 percent by weight of the organic nitro compound. However, greater or lesser proportions may be employed if desired.

The molar ratio of heterocumulene compound to the noble metal halide is generally between about 0.1 and about 10 and preferably between about 0.5 and about 4.0 but greater or lesser ratios may be employed if desired.

The process of this invention operates effectively in the absence of a solvent, but improved overall yields of the organic isocyanates can be obtained when a solvent which is chemically inert to the components of the reaction system is employed. Suitable solvents include aliphatic, cycloaliphatic or aromatic solvents, such as n-heptane, cyclohexane, benzene, toluene, and xylene, and halogenated aliphatic and aromatic hydrocarbons such as dichloromethane, tetrachloroethane, trichlorotrifluoroethane, monochloronaphthalene, monochlorobenzene, dichlorobenzene, trichlorobenzene, and perchloroethylene, as well as sulfur dioxide, mixtures thereof and the like.

The proportion of solvent is not critical and any proportion may be employed which will not require excessively large equipment to contain. Generally the weight percent of organic nitro compound in the solvent is in the range between about 5.0 and about 75 percent, but greater or lesser proportions may be employed if desired.

The order of mixing the reactants is not critical and may be varied within the limitations of the equipment employed. In one embodiment, the organic nitro compound, catalyst system, and if desired, solvent, is charged to a suitable pressure vessel such as an autoclave which is preferably provided with agitation means such as a stirrer or an external rocking mechanism. AT start-up after purging the system with nitrogen gas, carbon monoxide is fed into the autoclave until a pressure is attained, at ambient temperature, which is generally between about 30 and about 10,000 psig. After the reaction proceeds and heat is applied, the pressure may increase to as high as 30,000 psig. The preferred reaction pressure is between about 100 and about 20,000 psig. However, greater or lesser pressures may be employed if desired.

Generally the quantity of carbon monoxide in the free space of the reactor is sufficient to maintain the desired pressure as well as provide reactant for the process, as the reaction progresses. If desired, additional carbon monoxide can be fed to the reactor either intermittently or continuously as the reaction progresses. The reaction is believed to progress in accordance with the following equation:

(I)    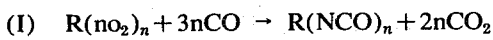$R(no_2)_n + 3nCO \rightarrow R(NCO)_n + 2nCO_2$ where R is the organic moiety of the organic nitro compound reactant of the type defined above, and $n$ is the number of nitro groups in the organic nitro compound. The total amount of carbon monoxide added during the reaction is generally between about 3 and about 50 and preferably between about 8 and about 15 moles of carbon monoxide per nitro group in the organic nitro compound. Greater or lesser amounts may be employed if desired. The highest carbon monoxide requirements are generally utilized in a process in which the carbon monoxide is added continuously, but suitable recycle of the carbon monoxide-containing gas streams greatly reduces the overall consumption of carbon monoxide.

The reaction temperature is generally maintained above about 25°C. and preferably between about 100°C. and about 250°C. Interior and/or exterior heating and cooling means may be employed to maintain the temperature of the reactor within the desired range.

The reaction time is dependent upon the organic nitro compound being reacted, temperature, pressure and on the amount of catalyst being charged, as well as the type of equipment being employed. Usually between one-half hour and 20 hours are required to obtain the desired degree of reaction, in a batch technique, but shorter or longer reaction times may be employed. In a continuous process, the reaction may be much lower, i.e., substantially instantaneous, and residence time may be substantially less than batch reaction time.

The reaction can be carried out batchwise, semi-continuously or continuously.

After the reaction is completed, the temperature of the crude reaction mixture may be dropped to ambient temperature, the pressure vessel is vented, and the reaction products are removed from the reaction vessel. Filtration or other suitable solid-liquid separation techniques may be employed to separate the catalyst from the reaction product, and fractional distillation is preferably employed to isolate the organic isocyanate from the reaction product. However, other suitable separation techniques such as extraction, sublimation, etc., may be employed to separate the organic isocyanate from the unreacted organic nitro compound and any by-products that may be formed.

Organic isocyanates produced in accordance with the technique of this invention are suitable for use in preparing polyurethane compositions such as foams, coatings, fibers and the like by reacting the organic isocyanate with a suitable polyether polyol in the presence of a catalyst and, if desired, a foaming agent. In addition, the organic isocyanates may be used in the preparation of biologically active compounds.

Some improvement in the conversion and yield of organic isocyanates can be obtained by employing a catalyst system which not only contains a heterocumulene compound and a noble metal halide but also contains a third component comprised of certain metal oxides. Oxides suitable as a third component of the catalyst system include at least one oxide of an element selected from the group consisting of vanadium, molybdenum, tungsten, niobium, chromium, tantalum, and iron, as described in co-pending application Ser. No. 619,158, filed Feb. 28, 1967, for Process, by Schnabel et al. and Ser. No. 757,105, filed Sept. 3, 1968, for Noble Metal Catalyst System Containing Oxide of Iron by Rao et al. These elements, with the exception of iron, are found in groups Va and VIa of the periodic table shown on p. 122 of Inorganic Chemistry by Moeller, John Wiley and Sons, Inc. 1952. Suitable oxides of this type include chromic oxide ($Cr_2O_3$), chromium dioxide ($CrO_2$), chromous oxide ($CrO$), molybdenum dioxide ($MoO_2$), molybdenum trioxide ($MoO_3$) and molybdenum sesquioxide ($Mo_2O_3$); niobium monoxide ($NbO$), niobium oxide ($NbO_2$), and niobium pentoxide ($Nb_2O_5$); tantalum dioxide ($Ta_2O_2$), tantalum tetraoxide ($Ta_2O_4$), and tantalum pentoxide ($Ta_2O_5$); tungstic oxide ($WO_2$), and tungstic trioxide ($WO_3$); vanadium dioxide ($V_2O_2$), vanadium trioxide ($V_2O_3$), vanadium tetraoxide ($V_2O_4$), vanadium pentoxide ($V_2O_5$), ferrous oxide ($FeO$) and ferric oxide ($Fe_2O_3$). Mixtures of two or more of these oxides may be employed as one component of the catalyst mixture. The proportion of the third component of the catalyst system, when one is employed, is generally equivalent to a weight ratio of the noble metal halide to the metal oxide in the catalyst system generally in the range between about 0.001:1 and about 25:1, and preferably in the range between about 0.005:1 and about 5:1.

The following examples are presented to describe the invention more fully without any intention of being limited thereby. All parts and percentages are by weight unless otherwise specified.

EXAMPLE I

In this example, 2,4-dinitrotoluene (5.0 g.), palladous chloride (0.4 g., $2.26 \times 10^{-3}$ moles) and phenyl isocyanate ($5.52 \times 10^{-3}$ moles) were charged to a clean, 100 ml. stainless steel autoclave (316 grade) together with orthodichlorobenzene solvent (5 ml.).

The autoclave was sealed after being so charged, then pressured with nitrogen and tested for leaks. Nitrogen was released and the autoclave was pressured with carbon monoxide to about 2,500 psig. During the reaction the autoclave was rocked in a rocker (36 cycles per minute), and heated during 1 hour to 190°C., when the internal pressure rose to about 3,800 psig. This temperature was maintained for 3 hours, and then reduced to ambient temperature. After venting, the contents were discharged and weighed, and the autoclave was rinsed with two 5 ml. portions of orthodichlorobenzene. Insoluble matter present (unreacted catalyst or solids formed during the reaction) was filtered from the reaction mixture and washed with dichlorobenzene, and then ether. The wash solutions were combined with the filtrate. Weight percentages of 2,4-dinitrotoluene, 2,4-toluene diisocyanate, 2-isocyanato-4-nitrotoluene and 4-isocyanato-2-nitrotoluene in the filtrate were determined by vapor phase chromatography. The conversion of 2,4-dinitrotoluene was calculated to be 74 percent. The yield of 2,4-toluene diisocyanate and the combined yield of mononitrotolyl isocyanates were calculated and corrected for the amount of 2,4-dinitrotoluene which was recovered. The yield of toluene diisocyanate was 3 percent and the total yield of isocyanates products was 24 percent.

For purposes of comparison additional experiments were carried out employing a procedure similar to that of example I except that the catalyst was solely $PdCl_2$ or solely $RhCl_3$. Not more than a trace of isocyanate was detected in these experiments.

EXAMPLES II–XVIII

The procedure of example I was repeated except that the catalyst system employed was varied as shown in table 1. Other pertinent details are also given in table 1 which follows:

TABLE 1

| Example | Noble metal halide | % by wt.1 | Catalyst Hetero-cumulene comp. (A) | Moles of (A) Comp./mole noble metal Halide | % conversion $TDI_2$ | % yield total products3 |
|---|---|---|---|---|---|---|
| II | $PdCl_2$ | 8 | phenyl isocyanate | 2:1 | 54 | 2 | 22 |
| III | $RhCl_3$ | 8 | phenyl isocyanate | 1:1 | 58 | 3 | 15 |
| IV | $RhCl_3$ | 8 | phenyl isocyanate | 1:1 | 27 | 0 | 20 |
| V | $PdCl_2$ | 8 | phenyl isocyanate | 1:1 | 42 | 5 | 45 |
| VI | $PdCl_2$ | 8 | 2,4-toluene diisocyanate | 1:1 | 11 | 0 | 18 |
| VII | $PdCl_2$ | 8 | 2,4-toluene | 2:1 | 16 | 4 | 9 |

| | | | diisocyanate | | | | |
|---|---|---|---|---|---|---|---|
| VIII | PdCl$_2$ | 8 | 2,4-toluene diisocyanate | 2:1 | 12 | 6 | 10 |
| IX | PdCl$_2$ | 8 | phenyl isothiocyanate | 2:1 | 8 | 0 | 62 |
| X | RhCl$_3$ | 8 | phenyl isothiocyanate | 3:1 | 13 | 0 | 1 |
| XI | RhCl$_3$ | 8 | N-sulfinyl-p-toluidine | 3:1 | 28 | 4 | 26 |
| XII | RhCl$_3$ | 8 | N-sulfinyl-p-toluidine | 3:1 | 40 | 2 | 24 |
| XIII | RhCl$_3$ | 8 | N-sulfinyl-p-toluidine | 2:1 | 9 | 1 | 6 |
| XIV | RhCl$_3$ | 8 | N-sulfinyl-p-toluidine | 2:1 | 6 | 3 | 10 |
| XV | RhCl$_3$ | 8 | N-sulfinyl-p-toluidine | 1:1 | 9 | 5 | 42 |
| XVI | PdCl$_2$ | 8 | Diphenyl carbodiimide | 1:1 | 63 | 3 | 19 |
| XVII | PdCl$_2$ | 8 | N,N'-di-p tolyl carbodiimide | 1:1 | 42 | 0 | 10 |
| XVIII | RhCl$_3$ | 8 | N,N'-di-p-tolyl carbodiimide | 3:1 | 72 | 4 | 22 |

[1] Based on the weight of dinitrotoluene, which was 5 grams in each instance
[2] 2,4-toluene diisocyanate
[3] Total isocyanate product, including monoisocyanato-mononitro compounds

EXAMPLES XIX-XX

The general procedure of example I was repeated with the exception that palladous chloride and the phenyl isocyanate were replaced with the following catalyst systems.

In each example, the yield of isocyanate was improved over that obtained with the noble metal catalyst alone.

What is claimed is:

1. In the process for preparing an aromatic isocyanate by reacting an aromatic nitro compound containing up to about 20 carbon atoms with carbon monoxide at an elevated temperature and an elevated pressure in the presence of a catalyst system, the improvement which comprises employing as said catalyst
   I. a mixture of
      A. a heterocumulene compound of the formula

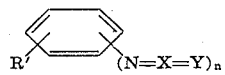

wherein
      1. R' is selected from the group consisting of
         a. hydrogen,
         b. alkyl,
         c. aryl,
         d. alkaryl, and
         e. aralkyl
      2. X is selected from the group consisting of
         a. carbon, and
         b. sulfur
      3. Y is selected from the group consisting of
         a. sulfur,
         b. oxygen, and
         c. —NR''
      4. R'' is aryl
      5. n is an integer of from 1 to 2 inclusive
      6. said alkyl contains between one and eight carbon atoms
      7. said aryl, said alkaryl and said aralkyl contain between six and 12 carbon atoms, and
      8. with the proviso that when Y is sulfur, then X is carbon, and
   B. a noble metal compound selected from the group consisting of noble metal halides and noble metal oxides, or
   II. a complex of a compound of IA and a noble metal compound of IB,
   III. wherein the molar ratio of said heterocumulene compound to the anion of said noble metal compound in said catalyst system is in the range between about 0.1:1 and about 10:1, and
   IV. wherein the noble metal of said noble metal compound is selected from the group consisting of palladium, rhodium, iridium, platinum, rhenium, ruthenium and mixtures thereof.

2. The process of claim 1 wherein the molar ratio of said heterocumulene compound to the anion of said noble metal compound is in the range between about 0.5:1 and about 4:1.

3. The process of claim 1 wherein the proportion of said catalyst system is between about 0.001 and about 500 weight percent of said aromatic nitro compound.

4. The process of claim 1 wherein the proportion of said catalyst system is between about 1 and about 100 weight percent of said aromatic nitro compound.

5. The process of claim 1 wherein said aromatic nitro compound is selected from the group consisting of nitrobenzene, dinitrotoluene and isocyanato-nitrotoluene.

6. The process of claim 5 wherein said catalyst system contains a third component comprised of an oxide of a metal selected from the group consisting of iron, vanadium molybdenum, tungsten, niobium, chromium and tantalum.

7. The process of claim 5 wherein said catalyst system is palladous chloride and phenyl isocyanate.

8. The process of claim 5 wherein said catalyst system is rhodium trichloride and phenyl isocyanate.

9. The process of claim 5 wherein said catalyst system is palladous chloride and 2,4-toluene diisocyanate.

10. The process of claim 5 wherein said catalyst system is rhodium trichloride and phenyl thioisocyanate.

11. The process of claim 5 wherein said catalyst system is rhodium trichloride and N-sulfinyl-p-toluidine.

12. The process of claim 1 wherein said heterocumulene compound is selected from the group consisting of
   a. phenyl isocyanate
   b. p-tolyl isocyanate
   c. 2,4-toluene diisocyanate
   d. phenyl isothiocyanate
   e. p-tolyl isothiocyanate
   f. N-sulfinyl aniline
   g. N-sulfinyl-p-toluidine
   h. diphenyl carbodiimide
   i. N,N-di-p-tolyl carbodiimide.

13. The process of claim 12 wherein said noble metal compound is selected from the group consisting of palladous chloride, rhodium trichloride, iridium trichloride, rhenium trichloride, platinic chloride and mixtures thereof.

14. The process of claim 13 wherein said elevated pressure is in the range between about 30 and about 30,000 psig, said elevated temperature is in the range between about 100° and about 250°C., and the proportion of carbon monoxide is in the range between about 3 and about 50 moles of carbon monoxide per nitro group in said aromatic nitro compound.

15. The process of claim 13 wherein said aromatic nitro compound is selected from the group consisting of nitrobenzene, dinitrotoluene and isocyanatonitrotoluene.

16. The process of claim 15 wherein the proportion of said catalyst system is between about 1 and about 100 weight percent of said aromatic nitro compound.

17. The process of claim 16 wherein the molar ratio of said heterocumulene compound to the anion of said noble metal compound is between about 0.5:1 and 4:1.

18. The process of claim 17 wherein said elevated pressure is in the range between about 100 and about 20,000 psig, said elevated temperature is in the range between about 100° and 250°C., and the proportion of carbon monoxide is in the range between about eight and about 15 moles of carbon monoxide per nitro group in said aromatic nitro compound.

19. The process of claim 17 wherein said catalyst system contains a third component comprised of an oxide of a metal selected from the group consisting of vanadium, molybdenum, tungsten, niobium, chromium, iron and tantalum.

20. The process of claim 50 wherein said oxide of a metal is selected from the group consisting of chromic oxide, chromium dioxide, chromous oxide, molybdenum sesquioxide, molybdenum dioxide, molybdenum trioxide, niobium monoxide, niobium oxide, niobium pentoxide, tantalum dioxode, tantalum tetraoxide, tantalum pentoxide, tungstic oxide, tungstic trioxide, vanadium dioxide, vanadium trioxide, vanadium tetraoxide, vanadium pentoxide, ferrous oxide, ferric oxide and mixtures thereof.

* * * * *